United States Patent
Servaes

(10) Patent No.: US 11,713,161 B2
(45) Date of Patent: Aug. 1, 2023

(54) SUPPORT RACK FOR STORING OR TRANSPORTING PLATE-SHAPED OBJECTS, COMBINATION OF A TRANSPORT PALLET AND SUCH A SUPPORT RACK, KIT OF PARTS FOR MANUFACTURING SUCH A SUPPORT RACK AND USE OF SUCH A SUPPORT RACK

(71) Applicant: Deltarack bvba, Hoogstraten (BE)

(72) Inventor: Jan Servaes, Hoogstraten (BE)

(73) Assignee: Deltarack bvba, Hoogstralen (BE)

( * ) Notice: Subject to any disclaimer, the term of this patent is extended or adjusted under 35 U.S.C. 154(b) by 98 days.

(21) Appl. No.: 17/303,665

(22) Filed: Jun. 4, 2021

(65) Prior Publication Data
US 2021/0387767 A1    Dec. 16, 2021

(30) Foreign Application Priority Data

Jun. 10, 2020    (BE) .................................. 2020/5418

(51) Int. Cl.
*B65D 19/44*    (2006.01)

(52) U.S. Cl.
CPC .... *B65D 19/44* (2013.01); *B65D 2519/00815* (2013.01)

(58) Field of Classification Search
CPC ................ B65D 19/44; B65D 19/0095; B65D 19/0038; B65D 85/48; B65D 2519/00815; B65D 2519/00333; B65D 2519/00293; B65D 2519/00323; B65D 2519/00273; B65D 2519/00029; B65D 2519/00064; B65D 2519/00034; B65D 2519/00069; B65D 2519/00038; B65G 49/062; B62B 3/108

See application file for complete search history.

(56) References Cited

U.S. PATENT DOCUMENTS

| 2,760,647 | A | * | 8/1956 | Saul, Jr. | .................... B62B 3/02 |
| | | | | | 248/220.31 |
| 2,839,198 | A | * | 6/1958 | Lefevre | ................ B65G 49/062 |
| | | | | | 206/451 |
| 3,016,222 | A | * | 1/1962 | Arthur | ............... B65D 19/0095 |
| | | | | | 108/57.2 |
| 3,173,645 | A | * | 3/1965 | Gray | ....................... F16B 45/00 |
| | | | | | 410/99 |
| 3,878,942 | A | * | 4/1975 | Hansen | .................. B65D 85/48 |
| | | | | | 211/49.1 |

(Continued)

FOREIGN PATENT DOCUMENTS

| BE | 1020750 A3 | 4/2014 |
| EP | 1394058 A1 | 3/2004 |

(Continued)

*Primary Examiner* — Patrick D Hawn
(74) *Attorney, Agent, or Firm* — Tatonetti IP

(57) ABSTRACT

The present disclosure relates to a support rack for storing or transporting plate-shaped objects, a combination of a transport pallet and such a support rack, a kit of parts for manufacturing such a support rack and the use of such a support rack. In particular, the invention relates to support racks for storing and transporting plate-shaped articles such as glass panels, natural stone slabs, metal plates and the like, wherein the support racks consist mainly or entirely of plate-shaped, vertical support elements which are connected to each other by connecting slats.

20 Claims, 4 Drawing Sheets

(56) References Cited

U.S. PATENT DOCUMENTS

| | | | | | |
|---|---|---|---|---|---|
| 4,304,336 | A * | 12/1981 | Mays | | B60P 3/002<br>224/403 |
| 4,382,733 | A * | 5/1983 | Rodgers | | B65D 19/0095<br>248/346.02 |
| 5,906,282 | A * | 5/1999 | Aldrich | | B65G 49/062<br>206/454 |
| 6,386,376 | B1 * | 5/2002 | Mendoza-Castillo | | B65G 49/066<br>224/403 |
| 6,453,827 | B1 * | 9/2002 | Perazzo | | B65D 19/0012<br>108/51.3 |
| 6,478,281 | B2 * | 11/2002 | Turner | | A47B 97/04<br>40/518 |
| 8,376,291 | B1 * | 2/2013 | Groves | | B25H 1/04<br>182/180.1 |
| 8,403,142 | B2 * | 3/2013 | Rose | | B65D 85/48<br>206/448 |
| 8,726,816 | B2 * | 5/2014 | Servaes | | B65D 85/48<br>108/55.3 |
| 10,106,294 | B2 * | 10/2018 | Böttcher | | A47B 47/0075 |
| 10,336,528 | B2 * | 7/2019 | Fuller | | B65D 88/129 |
| 10,710,794 | B2 * | 7/2020 | Fuller | | B65D 88/129 |
| 11,167,920 | B2 * | 11/2021 | Duijts | | B65G 1/02 |
| 2003/0173314 | A1 * | 9/2003 | Knoll | | B65G 49/062<br>211/41.14 |
| 2014/0291187 | A1 * | 10/2014 | Servaes | | A47F 7/0042<br>206/454 |
| 2015/0368029 | A1 * | 12/2015 | Kronsteiner | | B65D 85/48<br>211/85.8 |
| 2017/0275051 | A1 * | 9/2017 | Böttcher | | B65D 85/48 |
| 2019/0283145 | A1 * | 9/2019 | Sargent | | F16M 11/048 |

FOREIGN PATENT DOCUMENTS

| | | |
|---|---|---|
| EP | 2783998 A1 | 10/2014 |
| EP | 3180270 A1 | 6/2017 |
| FR | 2809716 A1 | 12/2001 |
| WO | 2012031340 A1 | 3/2012 |

* cited by examiner

SUPPORT RACK FOR STORING OR TRANSPORTING PLATE-SHAPED OBJECTS, COMBINATION OF A TRANSPORT PALLET AND SUCH A SUPPORT RACK, KIT OF PARTS FOR MANUFACTURING SUCH A SUPPORT RACK AND USE OF SUCH A SUPPORT RACK

CROSS-REFERENCES TO RELATED APPLICATIONS

This Non-Provisional Utility Patent application claims the benefit of and priority to Belgium Patent Application Serial No. BE2020/5418, filed Jun. 10, 2020, and entitled "Support rack for supporting or transporting sheet-shaped objects, combination of a transportpaller and such a support rack, set of part for manufacturing such a support rack and use of such a support rack," the entire contents of which is hereby incorporated herein by reference.

BACKGROUND

The present invention relates to a support rack for storing or transporting plate-shaped objects, a combination of a transport pallet and such a support rack, a kit of parts for manufacturing such a support rack and the use of such a support rack.

In particular, the invention relates to support racks for storing and transporting plate-shaped articles such as glass panels, natural stone slabs, metal plates and the like, wherein the support racks consist mainly or entirely of plate-shaped, vertical support elements which are connected to each other by connecting slats.

Such support racks are known from BE1020750, WO2012/031340, EP2783998 and EP1394058.

These support racks are arranged to be moved by means of a pallet truck or forklift truck and are therefore provided with slats under which a pallet truck or the forks of a forklift truck can be placed in order to thereby be able to lift the support rack with its load. To that end, the support racks provide the necessary space at the bottom for the pallet truck or the forks of the forklift truck.

Also, the connecting slats, by means of which a support rack and its load are lifted by means of a pallet truck or forklift truck, must be made particularly strong in order not to break.

As a result, these support racks are relatively high and require relatively much material. This material must be relatively strong, because the dynamic load, for instance during braking during transport in a loaded state, can be very high, such that the racks have a relatively high cost.

In addition, although these racks are designed for use with forklifts, they are relatively fragile at their bottom side, such that in practice they may be damaged quickly if the bottom side is accidentally hit by the forks of a forklift truck. Therefore, they require a relatively careful treatment, which is not always possible in practice.

It may therefore be desirable to place support racks on transport pallets, as is known from EP3180270. However, the support racks of EP3180270 have a large number of different parts, making them expensive to manufacture and complex to assemble.

Moreover, due to their design, they have a relatively low stiffness, which must be compensated by using sturdy material to manufacture the various parts.

Also, they have only a small surface a tension strap can grasp onto to attach these support racks to a transport pallet, such that attaching these support racks must be done with care and there is a risk that the tension straps will slide during use such that the support rack is no longer attached to the transport pallet.

Also from FR2809716 support racks are known that can be placed on transport pallets. In these support racks, vertical support elements are connected to each other only by a single connecting slat at a side edge, such that these support racks have a low stiffness, in particular in a horizontal plane.

Although placement on a transport pallet is possible with the known support racks from BE1020750, WO2012/031340, EP2783998 and EP1394058, this has drawbacks, because then the placement of the plate-shaped articles is relatively high above the floor, such that unnecessary transport or storage volume is used, and whereby the centre of gravity is high, such that the stability of a support rack with load is relatively poor.

Such support racks are also ill-suited to be attached to a transport pallet, in particular because connecting slats get in the way when attachment means are applied, or because tension straps for attaching could make it more difficult placing a load.

SUMMARY

The invention relates to a support rack for storing or transporting plate-shaped objects, wherein the support rack has a height, a width, and a length, wherein the support rack comprises two or more plate-shaped support elements extending at a distance from each other in the lateral direction and the height direction, wherein the support elements each have a top edge, wherein the top edge comprises one or two first edge portions and one or two second edge portions, wherein the one or two second edge portions are horizontal or, in the direction from a side of the rack toward a first edge portion, slope downwardly at a first angle of 25° or less relative to an horizontal line, wherein the one or two first edge portions protrude above the one or two second edge portions, wherein the one or two first edge portions form a second angle of 25° or less relative to a vertical line, wherein the support elements each have a bottom edge, wherein the support rack comprises one or more first connecting slats and comprises at least two second connecting slats, wherein the first and second connecting slats extend in the longitudinal direction and connect the support elements with each other, wherein the one or more first connecting slats are attached to a first edge portion of the top edge of each of the support elements or to a vertical edge of each of the support elements, wherein the one or more first connecting slats are attached at a position higher than the lowest point of the one or two second edge portions, wherein the second connecting slats are attached to the bottom edge of each of the support elements or to the one or two second edge portions of the top edge of the support elements, but preferably to the bottom edge of each of the support elements.

This support rack is optimized to be used on and attached to a transport pallet, and to be manufactured with as few parts as possible and with minimal material consumption.

In a preferred embodiment, the support elements are connected to each other only by means of the first and second connecting slats. In other words, this means that the support rack is free from connecting slats other than the said first and second connecting slats.

Said one or more first connecting slats at the indicated positions already provide the support rack with sufficient rigidity in the vertical plane in the longitudinal direction and said second connecting slats at the indicated positions already provide the support rack with sufficient rigidity in the horizontal plane such that unnecessary connecting slats are avoided.

The one or more first connecting slats and the minimum two second connecting slats are further also collectively referred to as the connecting slats.

In a preferred embodiment, at least one of the connecting slats, but preferably all connecting slats, are made of a material with a lower flexural strength than the material of the support elements. Since the connecting slats do not have to withstand a significant vertical point load, unlike the connecting slats in known support racks, but only need to connect the support elements together to thereby impart rigidity to the support rack, they may be manufactured from a cheaper material with a lower flexural strength.

Preferably, said at least one of the connecting slats is made of OSB board or chipboard or wood fibre board, OSB board being preferred.

In a preferred embodiment, the lower points of the support rack lie in a horizontal geometric plane, wherein the vertical distance between the lowest point of the one or two second edge portions and this geometric plane is less than 200 mm, and preferably less than 150 mm, and more preferably less than 110 mm.

For the sake of completeness, it is noted that the lower points are the points with which the support rack, if it is placed on a flat horizontal surface, rests on the surface.

This has the advantage that the load is located closer to the bottom side of the support rack than with the known support racks, such that a loaded support rack has a lower centre of gravity.

This has the further advantage that less material is required to manufacture the support elements than the known support racks and that the support racks take up as little space as possible both in the unmounted state and in the mounted state.

In a preferred embodiment, the bottom edge of the support elements has a lower edge portion, wherein at least part of the lower points of the support rack lie on the lower edge portion. The lower edge portion of the bottom edge is the part of the bottom edge which has the greatest vertical distance from a random reference point on the respective support element.

As a result, the lower edge portion can rest with its lower points on a surface, such that the support elements directly rest on the surface.

In a preferred embodiment, the bottom edge of the support elements has a lower edge portion which is horizontal and which extends over at least 60% of the width of the support rack. As a result, the lower edge portion can rest on a surface over a large distance, such that, in practice, the support rack is stable and is not easily deformed when loaded.

In order to obtain high stiffness in the horizontal plane, it is desirable that two second connecting slats are horizontally at a centre-to-centre distance which is a minimum of 40%, and preferably a minimum of 65%, of the width of the support rack.

Preferably, the one or two second edge portions each make a third angle with the nearest first edge portion, wherein the third angle is comprised between 80° and 100°, and preferably between 88° and 92°.

Preferably, the first and second angles are each 15° or less, and more preferably 10° or less, to allow articles on the support rack to be positioned as vertically as possible.

In a preferred embodiment, the vertical distance between each point of the one or two second edge portions and the point directly below on the bottom edge is a minimum of 30 mm, and preferably a minimum of 40 mm. This is desirable for the strength of the support rack because the portion of the support elements below the second edge portions receives the greatest load during use.

In a preferred embodiment, the support rack comprises at least two first connecting slats that are located at different heights, wherein the vertical distance between the bottom side of the highest first connecting slat and the bottom side of the lowest first connecting slat is at least 33% of the height of the support rack and is preferably at least 45% of the height of the support rack. As a result, a greater rigidity of the support rack is obtained in the vertical plane in the longitudinal direction.

For the same reason, preferably the highest first connecting slat and the lowest first connecting slat are both attached to the same first edge portion or to the same vertical edge.

For the same reason, the support rack comprises at least two first connecting slats at a different height, wherein the vertical distance between these two first connecting slats is at least 15% of the height of the support rack.

In a preferred embodiment, the one or two second edge portions extend in total over a horizontal distance of at least 40%, and preferably at least 50% of the width of the support rack.

In a preferred embodiment, the support elements have two first edge portions and two second edge portions, wherein the first edge portions, viewed from below upwards, converge towards each other.

In a preferred embodiment, the support rack consists of said support elements and said one or more first connecting slats and said second connecting slats and connecting means for connecting the support elements to the connecting slats.

As a result, only a very limited number of different parts are required to make such a support rack.

In a preferred embodiment, the support elements and the connecting slats are made of wood-based board material. This may easily be processed in many known ways and is also widely and relatively cheaply available in various thicknesses and qualities, such that an optimal material may easily be chosen. Preferably, the support elements are made of plywood boards.

In a preferred embodiment, the first connecting slats and the second connecting slats are identical in shape in cross-section perpendicular to the longitudinal direction.

In a preferred embodiment, the connecting slats have a width and a thickness.

Preferably, the support elements have a thickness, wherein the thickness of the support elements is equal to the thickness of the connecting slats. This allows the parts of the support rack to be packed in a flat orientation without unnecessary empty volumes in the package.

Preferably, the first and/or the second connecting slats are also arranged in individual recesses which are arranged in the edges of the support elements, wherein the recesses have a width and shape that corresponds to the width and shape of the relevant connecting slat, wherein the recesses have a depth equal to or greater than the thickness of the respective connecting slat.

Preferably, the connecting slats have a first surface and a second surface extending in their lateral direction and in the longitudinal direction and have a third surface and fourth surface extending perpendicular to the first surface and the second surface and extending in the longitudinal direction, wherein the first surface has rounded transitions to the third surface and the fourth surface, wherein preferably the transitions have a radius of curvature of 4 mm or more.

This has the advantage that the connecting slats, with their rounded transitions first, can easily be placed in the recesses. In addition, the connecting slats are preferably provided with bores to receive dowels in their first surface. The rounded transitions prevent the connecting slats from being placed the wrong way around during assembly.

This also makes it easier for the connecting slats to fit into the recesses, because these recesses have rounded corners because it is very complex to make right-angled internal corners in board material by means of machining, such as milling.

Also, the width of the connecting slats is preferably at least 200% of the thickness of the connecting slats, wherein the lateral direction of the connecting slats runs parallel to the part of the respective top edge or bottom edge to which they are attached.

This means that the lateral direction of the one or more first connecting slats is substantially or completely vertical and that the lateral direction of the second connecting slats is substantially or completely horizontal. As a result, the first and second connecting slats, respectively, have more stiffness in the direction in which they should provide stiffness to the support rack, hence in the vertical plane in the longitudinal direction and the horizontal plane, respectively.

In a preferred embodiment, the connecting slats are made of the same material.

In a preferred embodiment, the connecting battens are geometrically identical.

This makes the manufacturing and stock management of the connecting slats simpler.

In a preferred embodiment, the support rack comprises exactly two or three or four support elements. In a preferred embodiment, the support rack comprises exactly two second connecting slats and exactly two or three first connecting slats.

In a preferred embodiment, the connecting slats are attached to the support elements by means of dowels, wherein the connecting slats are provided with bores for receiving the dowels.

The connecting slats are herein preferably attached to each of the support elements by means of at least two dowels, such that a rotation of the connecting slat with respect to the support element is prevented, such that the support rack has a higher rigidity.

The bores are herein preferably arranged at five different positions distributed over the length, wherein a first said position is located at a first distance from one end of the connecting slats, wherein a second said position is located at said first distance from the other end of the connecting slats, wherein a third said position is located midway between the first and second positions, wherein a fourth said position is located between the first position and the third position, wherein a fifth said position is located between the second position and the third position, wherein the fourth position and the fifth position are located at a distance from the third position corresponding to one-sixth of the distance between the first position and the second position.

This allows to use the same connecting slats for support racks with two or three or four support elements, wherein the mutual distance between the support elements is the same for support racks with three or four support elements.

The invention also relates to a combination of a transport pallet and a support rack according to the invention, wherein the second connecting slats are attached to the bottom edge of each of the support elements, wherein the support rack is placed on the transport pallet, wherein the second connecting slats are attached to the transport pallet, for instance by screws, nails or staples, or by means of tensioned tensioning straps which run over the second connecting slats and under the transport pallet or parts thereof.

The invention also relates to a kit of parts that comprises all parts necessary for manufacturing a support rack according to the invention, wherein the kit of parts comprises two or more plate-shaped support elements, wherein the kit of parts comprises three or more connecting slats, wherein the support elements, at positions where they are provided for attachment of a first or second connecting slat, are provided with dowels which are attached to the support elements, whereby preferably the three or more connecting slats are identical.

Preferably, the kit of parts comprises only two types of parts, i.e. said two or more plate-shaped support elements and said three or more connecting slats.

The invention also comprises the use of a support rack according to the invention for storing or transporting plate-shaped articles.

BRIEF DESCRIPTION OF THE DRAWINGS

In order to better explain the invention, a preferred embodiment of a support rack according to the invention is described, without the invention being limited to this embodiment, with reference to the following figures.

Figure 1:
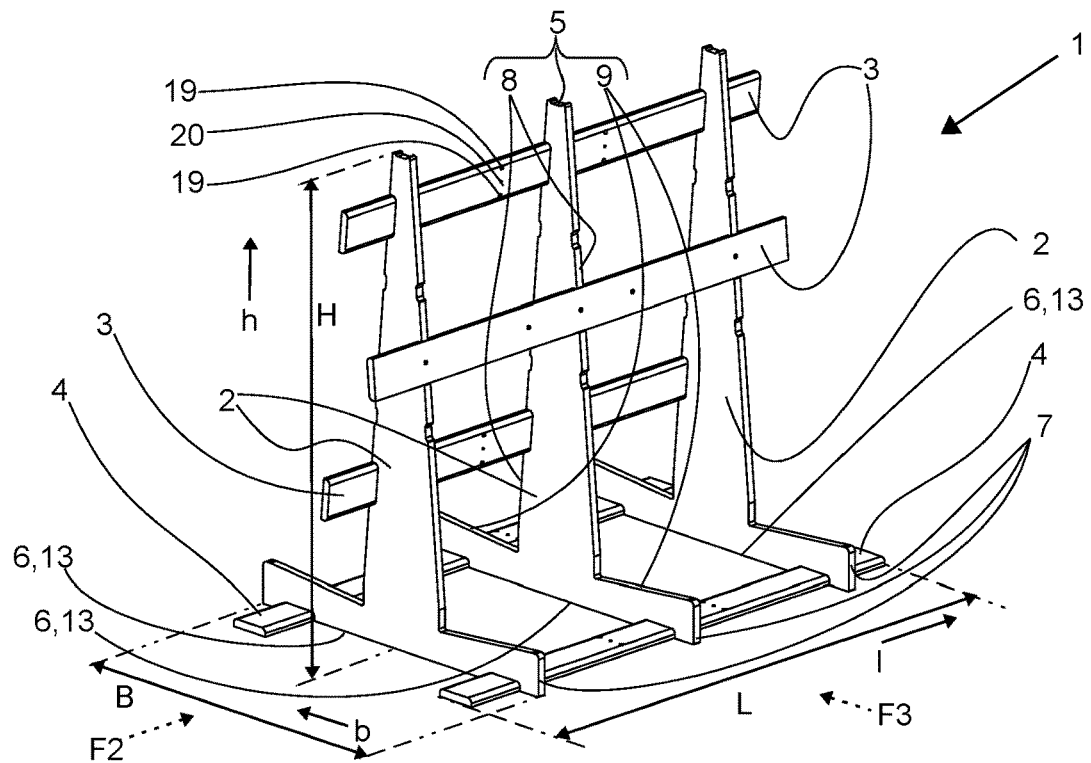
FIG. 1 is a perspective view of a support rack according to the invention.
Figure 2:
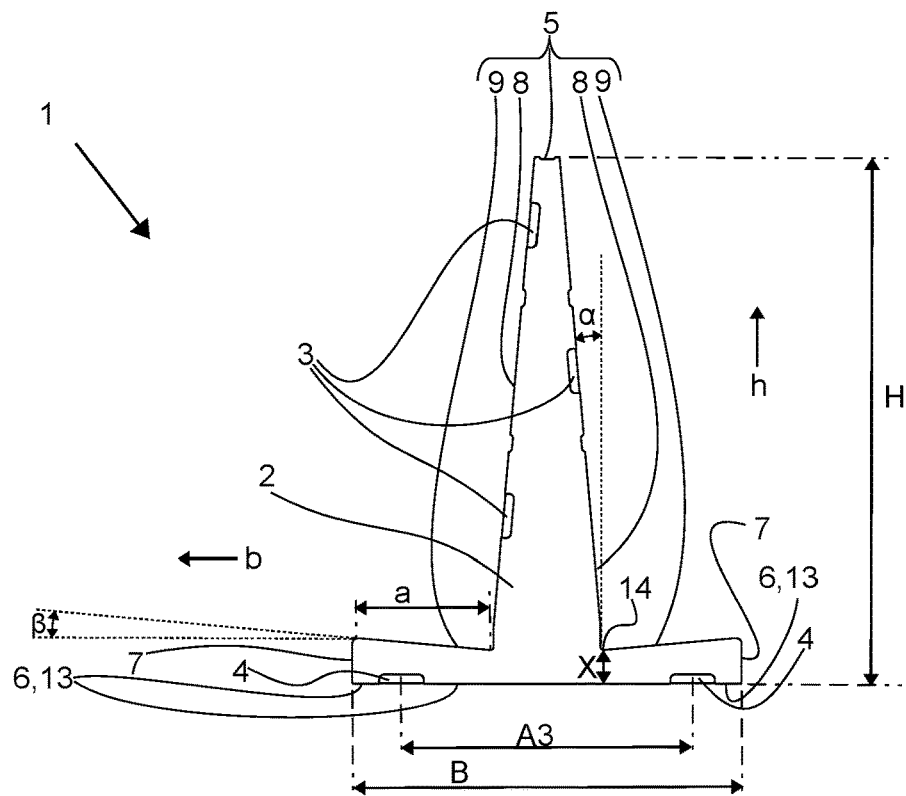
FIG. 2 is a front view along F2 of the support rack of FIG. 1.
Figure 3:
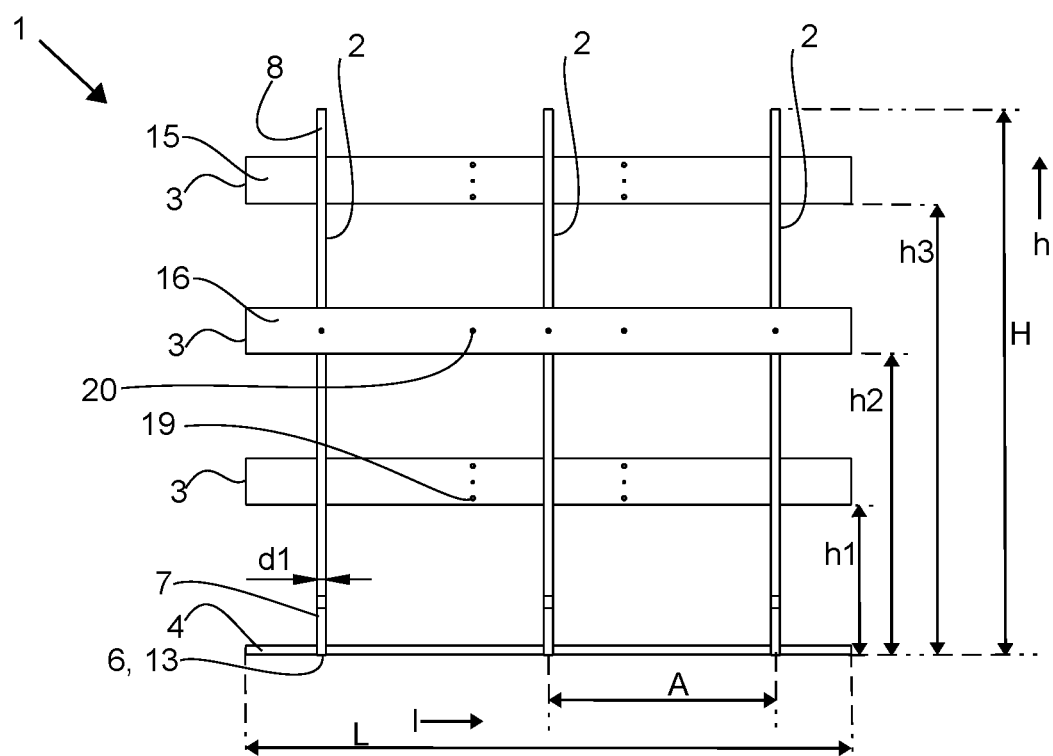
FIG. 3 is a side view along F3 of the support rack of FIG. 1.
Figure 4:
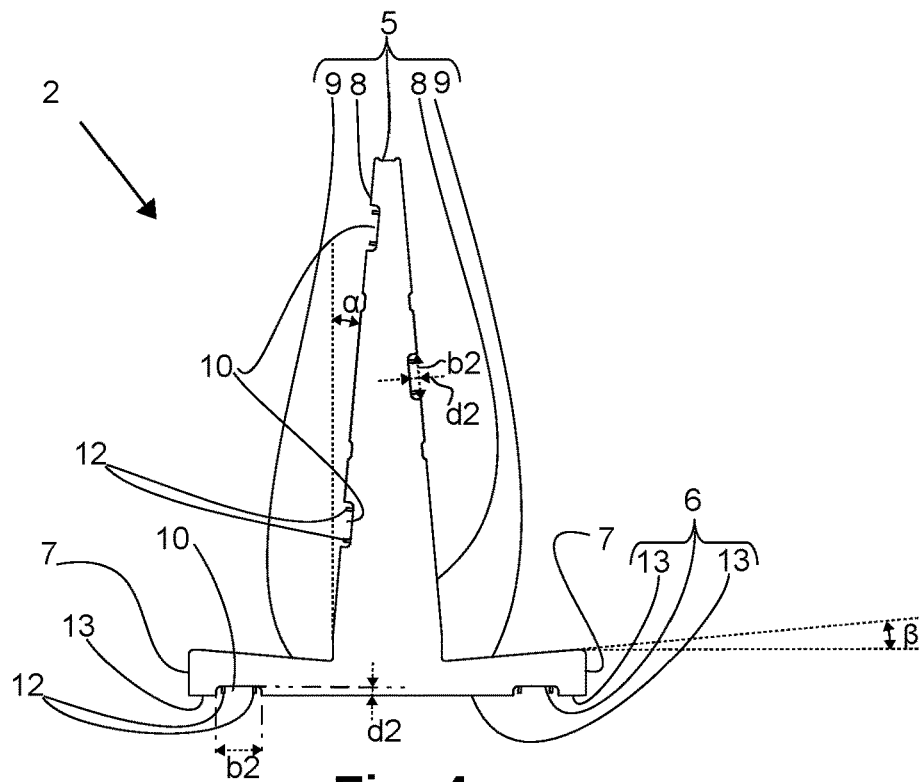
FIG. 4 is a front view of a part of the support rack of FIG. 1.
Figure 5:
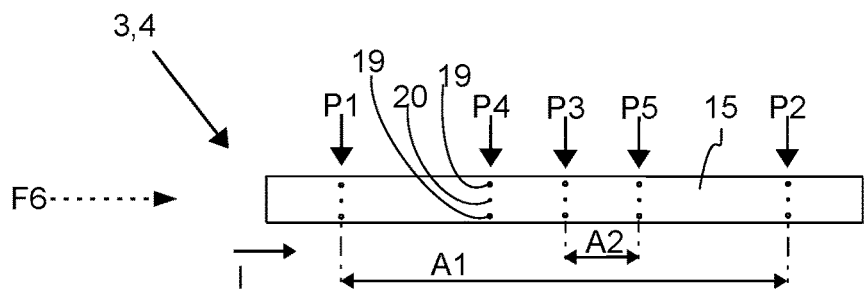
FIG. 5 is a side view of another part of the support rack of FIG. 1.
Figure 6:
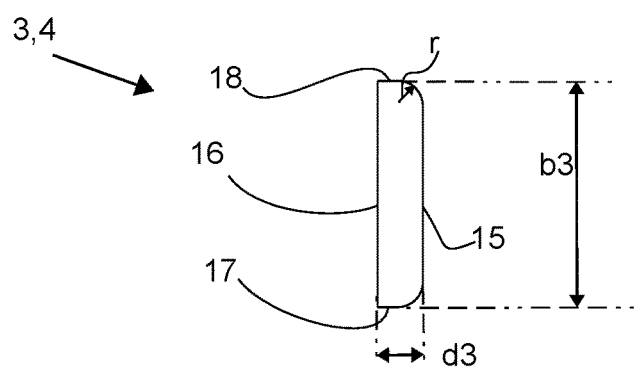
FIG. 6 is a side view along F6 showing the part of FIG. 5.

All figures are shown to the same scale, with the exception of FIG. 6 which is scaled to 500% of the other figures.

DETAILED DESCRIPTION

The support rack 1 of the figures has a height H of 1083 mm, a width B of 800 mm and a length L of 1200 mm.

The support rack 1 mainly consists of three support elements 2, three first connecting slats 3 and two second connecting slats 4.

The support elements 2 extend in the height direction h and the lateral direction b and are located at a mutual centre-to-centre distance A of 450 mm.

The support elements 2 are made from plywood boards with a thickness d1 of 18 mm by means of milling. The plywood is made of birch wood and has a flexural strength of 60 N/mm 2 measured in the direction of the fibres of its top layer and a flexural strength of 30 N/mm 2 measured in the direction perpendicular to these fibres.

The support elements 2 have an top edge 5 and a bottom edge 6 and side edges 7.

The top edge 5 of the support elements 2 mainly consists of four edge portions, i.e. two first edge portions 8, which form an angle α of 5° with a vertical line and which converge from bottom to top, and two second edge portions 9 which form an angle β of 5° with a horizontal line and which slopes downwardly from the side edges 7 of the support elements 2 in the direction of the first edge portions 8. The distance a over which the second edge portions 9 extend in the lateral direction b is 267 mm for each second edge portion 9.

In the first edge portions 8 of the top edge 5 and in the bottom edge 6 recesses 10 are provided with a depth d2 of 19 mm and a width b2 of 91.5 mm. Two dowels 12 are arranged in each of these recesses 10 by drilling holes in the support elements 2 at the location of the recesses 10 with a slightly smaller diameter than the diameter of the dowels 12 and then pressing the dowels 12 into these holes.

The bottom edge 6 has a straight and horizontal lower edge portion 13 and is, in this example, but not necessarily, completely formed by the lower edge portion 13 and the edges of the recesses 10.

The lowest point 14 of the top edge 5, i.e. the transition between the second edge portions 9 and the first edge portions 8, has a height X of 70 mm above the bottom edge 6.

The first and second connecting slats 3,4 are, in this example, but not necessarily, identical. Only their position and their orientation is different.

The connecting slats 3,4 are made of 'Oriented Strand Board' or OSB, in OSB3 quality with a thickness d3 of 18 mm. The OSB3 used has a flexural strength of 18 N/mm² measured in the direction of the wood chips of the outer layer and a flexural strength of 9 N/mm² measured in the direction perpendicular thereon.

The connecting slats 3,4 have a width b3 of 91.5 mm.

As may be seen from FIG. 6, the connecting slats 3,4 have a substantially rectangular shape in cross-section, with rounded corners on one side. This means that in their longitudinal direction 1 they have substantially four mutually perpendicular surfaces, i.e. a first surface 15, a second surface 16, a third surface 17 and a fourth surface 18. The transitions between the first surface 15 and the third and fourth surfaces 17, 18 are rounded with a radius of curvature r of 10 mm.

The connecting slats 3,4 are provided at five positions along their longitudinal direction 1 with three bores at each of the said positions. These bores concern upper and lower bores 19, not extending through the full thickness d3, provided in the first surface 15 for fittingly receiving the dowels 12, and middle bores 20 passing through the full thickness d3 of the connecting slats 3,4 and which serve to serve, if necessary, as screw holes for the fixed attachment of the connecting slats 3,4 to the support elements 2.

These five positions are a first position P1 and a second position P2, each at a distance A1 of 150 mm from one end of the connecting slats 3,4, a third position P3 in the middle of the connecting slats 3,4 and a fourth position P4 and a fifth position P5, each at a distance A2 of 150 mm from the third position P3.

The first connecting slats 3 are arranged in the recesses 10 in the first edge portions 8 of the support elements 2. As a result, their lateral direction is parallel to the first edge portions 8, i.e. 5° deviating from vertical. The bottom sides of the first connecting slats 3 are located at heights h1, h2, h3 of 300, 600 and 900 mm, respectively. This allows the first connecting slats 3 to provide optimum rigidity to the support rack 1 in the vertical plane in the longitudinal direction 1.

The second connecting slats 4 are arranged in the recesses 10 in the bottom edge 6 of the support elements 2 and have a mutual centre-to-centre distance A3 of 600 mm. Their lateral direction is horizontal. As a result, the first connecting slats 3 can provide optimum rigidity to the support rack 1 in the horizontal plane.

The connecting slats 3,4 are arranged such that the dowels 12 attached to the support elements 2 slide into the bores 19 in the first surface 15 of the connecting slats 3,4. A rigid but releasable connection is hereby obtained. In this example, the connecting slats 3,4 are not screwed onto the support elements 2, although this is optionally possible.

Since the depth d2 of the recesses 10 is exactly 1 mm greater than the thickness d3 of the connecting slats 3,4, the connecting slats 3,4 are slightly recessed in the recesses 10. As a result thereof, the lower points of the support rack 1 are formed by the lower edge portions 13 of the bottom edges 6 of the support elements 2, and the support rack 1 thus rests on these lower edge portions 13.

Figure 7:
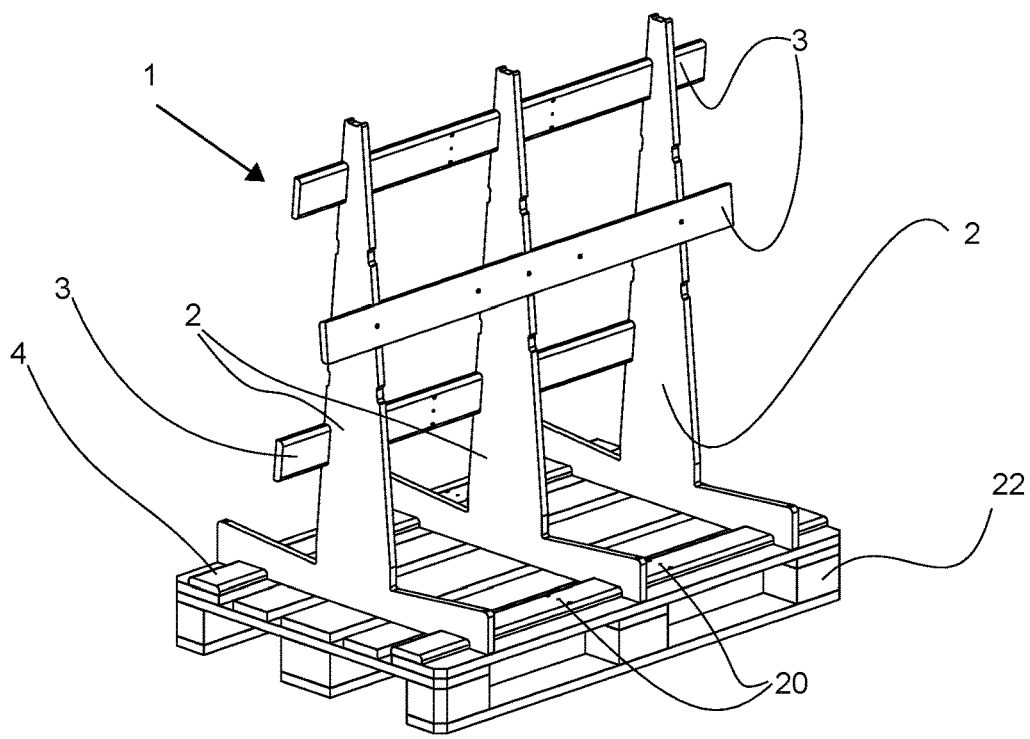
FIGS. 7 and 8 are a perspective view of a use of the support rack of the preceding figures.
Figure 8:
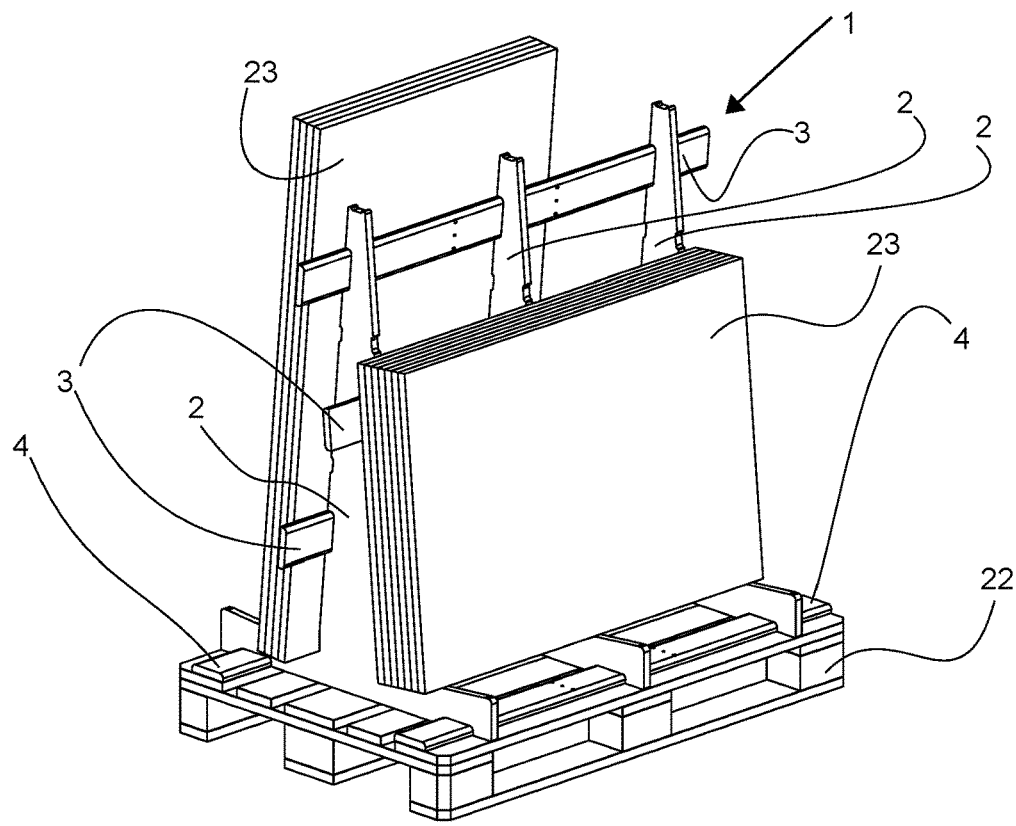

The use of the support rack 1 is shown in FIGS. 7 and 8.

First, as shown in FIG. 7, the support rack 1 is placed onto a transport pallet 22, on which it is fixed, but not necessarily in this example. This may be done, for example, by screws, whereby the middle bores 20 at the fourth and fifth positions P4, P5 of the second connecting slats 4 can be used.

Of course, this may also be done in other ways, for example by applying nails or staples or screws at random places in the second connecting slats 4, or by applying tensioning straps over the second connecting slats 4 and under the upper layer of the transport pallet 22.

Subsequently, as shown in FIG. 8, plate-shaped articles, such as glass panels 23 in this example, are placed on the support rack 1, the articles resting on the second edge portions 9.

Although in the above example the support elements 2 are made as a single piece, they may also consist of two or more parts which are attached to each other.

Although the second connecting slats 4 in the above example are arranged in the bottom edge 6, they may also provide sufficient rigidity to the support rack 1 if they are arranged at the second edge portion 9 of the top edge 5, for instance in recesses 10 in this second edge portion 9.

Although the support rack 1 comprises three support elements 2 in the above example, any number of support elements 2 may be used, in which case in particular two or three or four support elements 2 provide a good balance between stiffness and cost.

The dimensions of the support rack 1 of the example are not limiting. Similar support racks 1 of any desired size may easily be manufactured. Thereby, it is desirable to increase the number of first connecting slats 3 proportionally for greater heights.

Although the support rack 1 in the above example is symmetrical and has two equal first edge portions 8 and two equal second edge portions 9, a support rack 1 according to the invention may also be asymmetrical. It is also possible for a support rack 1 according to the invention to have only one first edge portion 8 and one second edge portion 9.

Although the support elements 2 in the above example have a straight bottom edge portion 13 which, with the exception of the edges of the recesses 10 in the bottom edge 6, extends over the full width of the support rack 1, the bottom edge 6 may also be other than straight, for instance corrugated, such that only a limited fraction of the bottom edge 6 forms the lower edge portion 13.

The invention claimed is:

1. A support rack for storing or transporting plate-shaped objects, wherein the support rack has a height, a width and a length, the support rack comprising:

two or more plate-shaped support elements extending at a distance from each other in the lateral direction and the height direction, wherein the support elements each have a top edge, wherein the top edge comprises one or two first edge portions and one or two second edge portions, wherein the one or two second edge portions are horizontal or, seen in the direction from a side of the rack toward a first edge portion, slope downwardly at a first angle ($\beta$) of 25° or less relative to an horizontal line, wherein the one or two first edge portions protrude above the one or two second edge portions, wherein the one or two first edge portions form a second angle ($\alpha$) of 25° or less relative to a vertical line, wherein the support elements each have a bottom edge, wherein the support rack comprises one or more first connecting slats and comprises at least two second connecting slats, wherein the first and second connecting slats extend in the longitudinal direction and connect the support elements to each other, wherein the one or more first connecting slats are attached to a first edge portion of the top edge of each of the support elements or are attached to a vertical edge of each of the support elements, wherein the one or more first connecting slats are attached at a position higher than the lowest point of the one or two second edge portions, wherein the second connecting slats are attached to the bottom edge of each of the support elements or to the one or two second edge portions of the top edge of the support elements, and wherein the second connecting slats have a width and a shape, wherein the second connecting slats are arranged in recesses made in the edges of the support elements, wherein the recesses have a width and shape corresponding to the width and shape of the second connecting slats.

2. The support rack of claim 1, wherein the flexural strength of the material of which the support elements are made, is higher than the flexural strength of the material of which at least one of the first or second connecting slats are made of.

3. The support rack of claim 1, wherein the support rack has lowermost points, wherein the lower most points of the support rack lie in a horizontal geometric plane, wherein the vertical distance between the lowest point of the one or two second edge portions and this geometric plane is less than 200 mm.

4. The support rack of claim 1, wherein the bottom edge of the support elements has a lower edge portion which is horizontal and which extends over at least 50% of the width of the support rack.

5. The support rack of claim 1, wherein the support rack has lowermost points, wherein the bottom edge of the support elements has a lower edge portion wherein at least a part of the lowermost points of the support rack lie on the lower edge portion.

6. The support rack of claim 1, wherein the one more first connecting slats have a width and a thickness, wherein the one or more first connecting slats are arranged in recesses made in the edges of the support elements, wherein the recesses have a width and shape corresponding to the width and shape of the one or more first connecting slats, and wherein the recesses have a depth equal to or greater than the thickness of the one or more first connecting slats.

7. The support rack of claim 1, wherein the support rack comprises at least two first connecting slats that are located at a different height, wherein the vertical distance between the bottom of the highest first connecting slat and the bottom of the lowest first connecting slat is at least 33% of the height of the support rack.

8. The support rack of claim 1, wherein the support rack consists of said support elements and said one or more first connecting slats and said second connecting slats and connecting means for connecting the support elements to the first connecting slats and to said second connecting slats.

9. The support rack of claim 2, wherein said at least one of the first or second connecting slats is made of OSB or chipboard or wood fibre board, wherein the support elements are made of plywood.

10. The support rack of claim 1, wherein the support elements are connected to each other only by means of the first and second connecting slats.

11. The support rack of claim 1, wherein the highest first connecting slat and the lowest first connecting slat are both attached to the same first edge portion or to the same vertical edge, wherein the vertical distance between these two first connecting slats is at least 15% of the height of the support rack.

12. The support rack of claim 1, wherein the second connecting slats are attached to the bottom edge of each of the support elements.

13. The support rack of claim 1, wherein the second connecting slats have a thickness, wherein the recesses have a depth equal to or greater than the thickness of the second connecting slats.

14. The support rack of claim 8, wherein the connecting means for connecting the support elements to said one or more first connecting slats are the same as the connecting means for connecting the support elements to said second connecting slats.

15. The support rack of claim 1, wherein the support rack is used for storing and transporting plate-shaped articles.

16. A support rack for storing or transporting plate-shaped objects, wherein the support rack has a height, a width and a length, wherein the support rack comprises two or more plate-shaped support elements extending at a distance from each other in the lateral direction and the height direction, wherein the support elements each have a top edge, wherein the top edge comprises one or two first edge portions and one or two second edge portions, wherein the one or two second edge portions are horizontal or, seen in the direction from a side of the rack toward a first edge portion, slope downwardly at a first angle ($\beta$) of 25° or less relative to an horizontal line, wherein the one or two first edge portions protrude above the one or two second edge portions, wherein the one or two first edge portions form a second angle ($\alpha$) of 25° or less relative to a vertical line, wherein the support elements each have a bottom edge, wherein the support rack comprises one or more first connecting slats and comprises at least two second connecting slats, wherein the first and second connecting slats extend in the longitudinal direction and connect the support elements to each other, wherein the one or more first connecting slats are attached to a first edge portion of the top edge of each of the support elements or are attached to a vertical edge of each of the support elements, wherein the one or more first connecting slats are attached at a position higher than the lowest point of the one or two second edge portions, and wherein the second connecting slats are attached to the bottom edge of each of the support elements or to the one or two second edge portions of the top edge of the support elements, wherein the first connecting slats and the second connecting slats are identical in shape and size in cross-sections perpendicular to the longitudinal direction.

17. The support rack of claim 16, wherein the first and second connecting slats have a width and a thickness, wherein the first and second connecting slats have a first surface and a second surface extending in their lateral direction and in the longitudinal direction and have a third surface and fourth surface extending perpendicular to the first surface and the second surface and extending in the longitudinal direction, wherein the first surface has rounded transitions to the third surface and the fourth surface.

18. A support rack for storing or transporting plate-shaped objects, wherein the support rack has a height, a width and a length, wherein the support rack comprises two or more plate-shaped support elements extending at a distance from each other in the lateral direction and the height direction,
wherein the support elements each have a top edge, wherein the top edge comprises one or two first edge portions and one or two second edge portions, wherein the one or two second edge portions are horizontal or, seen in the direction from a side of the rack toward a first edge portion, slope downwardly at a first angle ($\beta$) of 25° or less relative to an horizontal line, wherein the one or two first edge portions protrude above the one or two second edge portions, wherein the one or two first edge portions form a second angle ($\alpha$) of 25° or less relative to a vertical line,
wherein the support elements each have a bottom edge,
wherein the support rack comprises one or more first connecting slats and comprises at least two second connecting slats, wherein the first and second connecting slats extend in the longitudinal direction and connect the support elements to each other, wherein the one or more first connecting slats are attached to a first edge portion of the top edge of each of the support elements or are attached to a vertical edge of each of the support elements, wherein the one or more first connecting slats are attached at a position higher than the lowest point of the one or two second edge portions, and
wherein the second connecting slats are attached to the bottom edge of each of the support elements or to the one or two second edge portions of the top edge of the support elements, wherein the first and second connecting slats are attached to the support elements by means of dowels, wherein the first and second connecting slats are provided with bores for receiving the dowels.

19. The support rack of claim 18, wherein the bores are arranged at a minimum of five different positions distributed over the length, wherein a first said position is located at a first distance from one end of the first and second connecting slats, wherein a second said position is located at said first distance from the other end of the first and second connecting slats, wherein a third said position is located midway between the first and second positions, wherein a fourth said position is located between the first position and the third position, wherein a fifth said position is located between the second position and the third position, wherein the fourth position and the fifth position are located at a distance from the third position corresponding to one-sixth of the distance between the first position and the second position.

20. The support rack of claim 18, wherein the support elements are provided with said dowels and said dowels are attached to the support elements.

* * * * *